Jan. 19, 1965   J. E. ENGLEDEW ETAL   3,166,745
RADAR TRACKING
Filed March 16, 1960
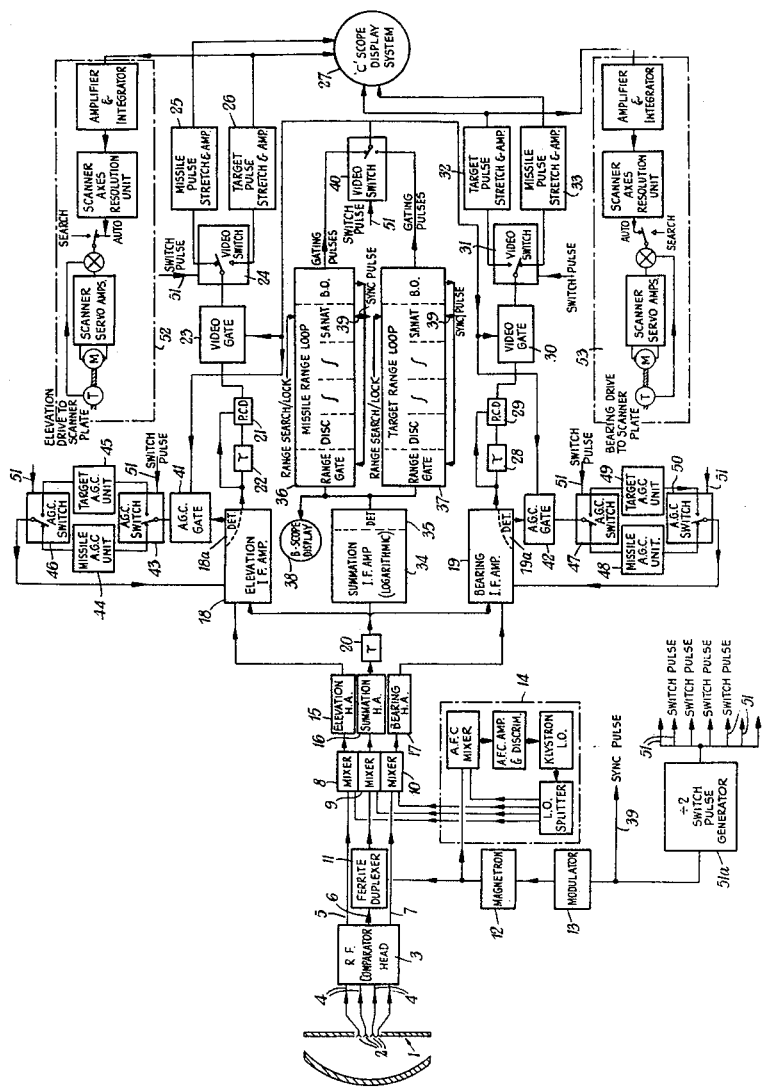
INVENTORS:
John Edward Engledew
Roland Ernest Ford
By
Bailey, Stephens & Huettig
Attorneys

United States Patent Office 3,166,745
Patented Jan. 19, 1965

3,166,745
RADAR TRACKING
John Edward Engledew, Leverstock Green, and Roland Ernest Ford, Edgware, England, assignors to Elliott Brothers (London) Limited, Lewisham, London, England, a company of Great Britain
Filed Mar. 16, 1960, Ser. No. 15,468
Claims priority, application Great Britain, Mar. 19, 1959, 9,633/59
36 Claims. (Cl. 343—7.4)

This invention relates to improvements in radar tracking systems.

It is an object of the present invention to provide an improved radar system which shall be capable of tracking an object in space and of providing information relating to the range of at least one further object in space and the elevation and bearing of said further object or objects relative to the first mentioned object.

The invention broadly stated provides a radar tracking system comprising an aerial system adapted to radiate pulses of electromagnetic energy in a directional beam and, in the interval between radiated pulses, to receive pulses of energy reflected from an object irradiated by the beam and to produce from the received pulses three output signals corresponding respectively to the range of the object represented by the algebraic sum of the received energy, an elevation error signal the phase and amplitude of which relative to the sum signal denotes the sense and magnitude respectively of departure of the elevation of the object from the mean beam axis and a bearing error signal the phase and amplitude of which relative to the sum signal denotes the sense and magnitude respectively of departure of the bearing of the object from the mean beam axis, means for cyclically detecting the phase difference between the respective elevation error signals and the sum signals due to the energy reflected from at least two irradiated objects, means for cyclically detecting the phase and amplitude difference between the respective bearing error signals and the sum signals due to the energy reflected from the irradiated objects, means responsive to both phase and amplitude difference detecting means to cause the aerial system to follow a selected one of the irradiated objects, means for deriving the bearing and elevation of the other irradiated object or objects relative to said selected one object and means responsive to the respective sum signals derived from the irradiated objects to determine the respective ranges thereof.

More specifically stated, a radar tracking system according to the present invention comprises an aerial system adapted to radiate pulses of electromagnetic energy in a directional beam and, in the interval between radiated pulses, to receive pulses of energy reflected from an object irradiated by the beam and to produce from the received pulses three output signals corresponding respectively to the range of the object represented by the algebraic sum of the received energy, an elevation error signal the phase and amplitude of which relative to the sum signal denotes the sense and magnitude respectively of departure the elevation of the object from the mean beam axis and a bearing error signal the phase and amplitude of which relative to the sum signal denotes the sense and magnitude respectively of departure of the bearing of the object from the mean beam axis, an elevation I.F. amplifier adapted to be supplied with the elevation error signal and the sum signal in series, one of these two signals being suitably delayed, a plurality of automatic gain control units corresponding in number to the number of objects capable of being handled by the system and arranged to be cyclically switched in successive intervals between radiated pulses to control the gain of the elevation I.F. amplifier at an optimum value for the respective signals reflected from at least two irradiated objects, an elevation phase sensitive detector for detecting the phase and amplitude of the amplified elevation error signal relative to that of the amplified sum signal, a plurality of pulse lengthening and amplifying circuits corresponding in number to the number of objects capable of being handled by the system and having their inputs cyclically switched to the output of the elevation phase sensitive detector in synchronism with the switching of the automatic gain control units and having their outputs connected to a display system, a selected one of the circuits having its output connected to means responsive to the output thereof to cause the aerial system to follow the elevation of the object corresponding to the selected circuit, a bearing I.F. amplifier adapted to be supplied with the bearing error signal and the sum signal in series, one of these two signals being suitably delayed, a plurality of automatic gain control units corresponding in number to the number of objects capable of being handled by the system and arranged to be cyclically switched to control the gain of the bearing I.F. amplifier at an optimum value for the respective signals reflected from at least said two irradiated objects, the switching being synchronised with that of the corresponding units associated with the elevation I.F. amplifier, a bearing phase sensitive detector for detecting the phase and amplitude of the amplified bearing error signal relative to that of the amplified sum signal, a plurality of pulse lengthening and amplifying circuits corresponding in number to the number of objects capable of being handled by the system and having their inputs cyclically switched to the output of the bearing phase sensitive detector in synchronism with the switching of the automatic gain control units and having their outputs connected to said display system, a selected one of the circuits, corresponding to the selected circuit associated with the elevation phase sensitive detector, having its output connected to means responsive to the output thereof to cause the aerial system to follow the bearing of said object corresponding to the selected circuit and a plurality of range search and lock-on units corresponding in number to the number of objects capable of being handled by the system and adapted to be supplied with the sum signal to provide an indication of the ranges of respective objects irradiated in the beam.

It is preferred that the system shall be capable of handling only two objects one of which is a target which the aerial system is caused to follow and the other of which is a missile directed towards the target, the system providing an indication of the range, elevation and bearing of the target, the range of the missile and the deviation of the elevation and bearing of the missile from the bearing and elevation of the target.

One embodiment of the present invention will now be described by way of example, reference being made to the accompanying drawing which represents a radar tracking system capable of tracking a selected target object in space and of tracking a missile directed towards the target object.

The radar tracking system of this embodiment comprises an aerial system indicated generally at 1 which is adapted to radiate pulses of R.F. energy in a directional beam and, in the interval between radiated pulses, to receive pulses of energy reflected from objects irradiated by the beam. The aerial system comprises four wave-guide horns 2 which are not disposed one above the other as is shown for convenience in the diagram but which are disposed as the four quarters of a square. The horns 2 are connected to an R.F. comparator head 3 by wave guides 4 which comparator head 3 has three output wave guides 5, 6 and 7 respectively, each leading to a separate mixer 8, 9 and 10 respectively. The wave guide 6 passes through a ferrite duplexer 11 to which pulses of R.F. energy are supplied from a magnetron 12 controlled by a modulator 13, the magnetron 12 producing short pulses of R.F. energy at a pulse repetition frequency of 4000 p.p.s. These pulses are supplied along the wave guide 6 to the comparator head 3 which distributes the energy of the pulses equally between the horns 2 from which the energy is radiated as a pencil beam. When an object is irradiated by the beam, pulses of R.F. energy are reflected and received by the horns 2 in the interval between successive radiated pulses. If the object is on the beam axis the reflected energy will be equally distributed between the four horns 2, but if it is not on the beam axis then the reflected energy will not be equally distributed between the four horns 2 and its distribution provides an indication of the departure of both the bearing and elevation of the irradiated object from the beam axis. Assuming that the instantaneous reflected energy received by the top left hand horn 2 is A (as seen from the front of the horns), that received by the top right hand horn 2 is B, that received by the lower left-hand horn is C and that received by the lower right-hand horn is D, then the comparator head provides outputs along the guides 5, 6 and 7 of $(A+B)-(C+D)$; $(A+B+C+D)$: and $(A+C)-(B+D)$ respectively. The phase and amplitude of the output along the guide 5 relative to that along the guide 6 therefor represents the elevation error of the irradiated object, the phase and amplitude of the output along the guide 7 relative to that along the guide 6 represents the bearing error of the irradiated object and the sum signal along the guide 6 represents by its position in time relative to the preceding radiated pulse the range of the irradiated object. The mixers 8, 9 and 10 are supplied from a suitable oscillator source 14 linked with the output of the magnetron 12 and are arranged to convert the signals received along the guides 5, 6 and 7 to an intermediate frequency which in this example is 60 mc./s. Separate low gain amplifiers 15, 16 and 17 are respectively connected to the outputs of the mixers 8, 9 and 10. The outputs of the amplifiers 15 and 17 are pulses of 60 mc./s. which are either in phase or out of phase with the output of the amplifier 16 according to the sense of misalignment of the irradiated object. The output of the amplifier 15 is the elevation error signal, the output of the amplifier 17 is the bearing error signal and the output of the amplifier 16 is the sum signal representing the range. These signals require to be amplified to a suitable operating level but it is important that the phase relationship between the bearing and elevation error signals and the sum signal should not be disturbed. The elevation error signal and the sum signal are therefor both passed to an I.F. amplifier 18 and the bearing error signal and the sum signal are both passed to a further I.F. amplifier 19, the sum signal being passed through a delay unit 20 to ensure that it arrives at the I.F. amplifiers 18 and 19 after the elevation and bearing error signals respectively. The output of the I.F. amplifier 18 is fed directly to a phase sensitive detector 21 and also through a delay unit 22 affording a delay corresponding to that of the unit 20 so that the phase sensitive detector 21 compares the sum and elevation error signals simultaneously and produces a D.C. output pulse representing by its polarity the difference in phase between the elevation error signal and the sum signal and by its amplitude the magnitude of the error signal. This D.C. output pulse is fed through a gate 23 and a switch 24, which may suitably be a diode switch, to one of two pulse stretching and amplifying circuits 25 and 26 the outputs of which are supplied to a cathode ray tube display system 27. The output of the I.F. amplifier 19 which is concerned with the bearing error signal similarly passes through a delay unit 28, a phase-sensitive detector 29, a gate 30, a switch 31 to one of two pulse stretching and amplifying circuits 32 and 33 having their outputs connected to the display system 27. The sum signal from the amplifier 16 after passing through the delay unit 20 also passes to a summation logarithmic I.F. amplifier 34 incorporating a detector stage 35 the output of which is supplied to two range search and lock on units 36 and 37 which will search for and lock on to the sum signal and provide an indication of the range of the irradiated object on a cathode ray tube display system 38. Each unit 36 and 37 is controlled by synchronising pulses derived in synchronism with the radiated pulses from the modulator 13 along line 39 and produces a gating pulse which corresponds in time to the position in time of the received pulses and hence of the bearing and elevation error signals and the sum signal to which the respective units are locked, the position in time of the sum signal relative to the preceding synchronising pulse denoting the range of the object from which the sum signal is derived. These gating pulses are supplied through a switch 40, again suitably a diode switch, which feeds the gating pulses to the gates 23 and 30 and to automatic gain control gates 41 and 42 respectively connected to detector stages 18a and 19a of the I.F. amplifiers 18 and 19. The output of the gate 41 passes through a switch 43 (similar to the other switches mentioned) to one of two automatic gain control units 44 and 45 the outputs of which are supplied through a further switch 46 to the I.F. amplifier 18 to control the gain thereof. There are associated with the gate 42 in a similar manner a switch 47, automatic gain control units 48 and 49 and a switch 50.

All the switches are controlled by rectangular switch pulses fed along lines 51 and derived from the modulator at one half the pulse recurrence frequency by means of a single frequency dividing unit 51a. The switches are therefor set to one position during every other interval between radiated pulses and return to their other position or condition during the remaining intervals between pulses.

It will be observed that with the switches in the position shown in the diagram the range unit 36, the pulse stretching and amplifying units 25 and 33 and the automatic gain control units 44 and 48 are operative and these will hereinafter be referred to as missile units or circuits, the range unit 37, pulse stretching and amplifying circuits 26 and 32 and the automatic gain control units 45 and 49 being referred to as target units or circuits. The target circuit 26 has its output connected to suitable means 52 for varying the elevation of the aerial system to correct for any departure of the elevation of the target from the beam axis and the target circuit 32 is similarly connected to suitable means 53 for varying the bearing of the aerial system to correct for any departure of the bearing of the target from the beam axis.

The operation of the system described is as follows: The radiated pulse beam is caused to scan space until a target is detected the range and speed of which is sampled by the range unit 37 which is caused to lock on to the target if it is deemed suitable, the range unit 37 scanning downwards from maximum range until it detects and locks on to the target. At a suitable instant in time the missile is fired at the target so that both the target and missile are reflecting energy back to the system which has to handle the information relating thereto. Therefor in any interval between pulses the I.F. amplifier 18 is receiving a sum signal and an elevation error signal relating to the target and a sum signal and an elevation error signal relating to the missile, the missile signals being received earlier in time than the target signals as it is nearer the system. The target range unit 37 is locked on to the target and producing gating pulses occurring at substantially the same time as the target signals appear in the I.F. amplifier 18 and the gate 23 and the missile range unit 36, which scans from a minimum range upwards, locks on the missile and produces gating pulses occurring at substantially the same time as the missile signals appear in the I.F. amplifier 18 and gate 23. In any one interval between radiated pulses only one of these gating pulses can pass through the switch 40 operated by the switch pulses. Assuming the switch 40 is set as illustrated to pass the missile gating pulse then the switch 24 is set to render the missile circuit 25 operative and the switches 43 and 46 are set to render the missile automatic gain control unit 43 operative. The gates 23 and 41 are opened by the gating pulse from the missile range unit 36 so as to permit the passage therethrough of the missile signals but not the target signal and the I.F. amplifier 18 is thereby set to optimum gain for the missile signals. The output from the missile circuit 25 produces an indication on the display 27 of the elevation of the missile. The bearing units and circuits associated with the I.F. amplifier 19 are controlled and operate similarly so that the output of the missile circuit 33 produces an indication on the display 27 of the bearing of the missile. During this interval of time the target signals are ineffective due to the gates 23 and 41 and 30 and 42 being closed to them.

In the next interval of time between radiated pulses the switches are switched over to their other position in which the gates 23 and 41 and 30 and 42 are only open for the target signals, the target units and circuits now being rendered operative and the missile units and circuits inoperative. Thus the I.F. amplifiers 18 and 19 are set to optimum gain for the target signals and the target circuits 26 and 32 produce outputs which produce an indication of the target elevation and bearing respectively on the display and which also cause the aerial system to follow the target and maintain it substantially on the beam axis due to the operation of the target following means 52 and 53. The bearing and elevation of the missile therefore appear on the display system 27 relative to the bearing and elevation of the target and an observer is able to note any departure of the missile from its desired course and transmit to the missile the necessary information to correct its course. Alternatively the information relating to the bearing and elevation of the missile relative to the target may be processed automatically to control its course.

It will be appreciated that in the system described all the switches are controlled by switch pulses derived from the common frequency divider 51a so that even should the latter miss a pulse, as sometimes happens, all the switches will be set to deal either with the target signal or with the missile signal and all parts of the system will be concerned with the same signal and will not confuse the missile and target signals and no errors will result. It will also be noted that no switching is involved in feeding the sum signals to the range units 36 and 37 so that the danger of one or other range units coming off lock due to switching effects is avoided.

It will be further appreciated that any error introduced by the system is largely common to both the missile and target signals so that the information relating to the bearing and elevation of the missile relative to the target is accurate to the degree required for the purposes in view.

What we claim is:

1. A radar tracking system adapted to radiate pulses of electromagnetic energy in a directional beam and, in the interval between radiated pulses, to receive pulses of energy reflected from an object irradiated by the beam and to produce from the received pulses three output signals corresponding respectively to the amplitude sum of the received energy which represents the range of the object by its position in time relative to the immediately preceding radiated pulse, an elevation error signal the phase and amplitude of which relative to the sum signal denotes the sense and magnitude respectively of departure of the elevation of the object from the mean beam axis and a bearing error signal the phase and amplitude of which relative to the sum signal denotes the sense and magnitude respectively of departure of the bearing of the object from the mean beam axis, means for cyclically detecting the phase and amplitude difference between each elevation error signal and the corresponding sum signal produced from the pulses of energy reflected from each of at least two irradiated objects, means for cyclically detecting the phase and amplitude difference between each bearing error signal and the corresponding sum signal produced from the pulses of energy reflected from each of the irradiated objects, means responsive to both phase and amplitude difference detecting means to cause the aerial system to follow a predetermined one of the irradiated objects, means for deriving the bearing and elevation of each other irradiated object relative to said predetermined one object and means responsive to the respective sum signals derived from the irradiated objects to determine the respective ranges thereof.

2. A system according to claim 1 wherein the aerial system comprises four horns and a radio-frequency comparator head connected to said horns to derive said three output signals.

3. A system according to claim 2 including a separate mixer unit associated one with each of the three output signals and an oscillator source connected to said mixer units to convert the output signals to an intermediate frequency.

4. A system according to claim 3 including a separate range search and lock on unit for each object to be tracked, each such unit being arranged to lock on to a separate signal representing the range of an associated object and to produce a gating pulse corresponding in time to the position in time of the pulses received at the aerial system from such associated object.

5. A system according to claim 4 wherein one of the range search and lock on units is arranged to scan downwards from maximum range until it detects and locks on to the associated object.

6. A system according to claim 5 wherein a second range search and lock on unit is arranged to scan from minimum range upwards until it detects and locks on to the associated object.

7. A system according to claim 4 wherein a range switch is supplied with the gating pulses and is operable to pass the gating pulses produced by a selected one of the range search and lock on units.

8. A system according to claim 7 wherein the range switch is operable by switch pulses derived from means for generating the radiated pulses.

9. A system according to claim 7 including an elevation amplifier, the gain of which is automatically controlled to be an optimum for the range and elevation error signals representing a selected object, said elevation amplifier being arranged to have the intermediate frequency signals representing the range and elevation error signals applied sequentially thereto, a separate automatic gain control elevation unit for each object to be tracked, elevation gain control switch means for selectively switching across the elevation amplifier that automatic gain control elevation unit associated with the selected object and an automatic gain control elevation gate connected between the gain control elevation units and the elevation amplifier and operable by the gating pulse derived from the range search and lock on unit associated with the selected object, the elevation gain control switch means and the range switch being operable in synchronism.

10. A system according to claim 9 including an elevation phase sensitive detector to which the amplified outputs of the elevation amplifier representing the range and elevation error signals are applied simultaneously to derive a direct current elevation output representing by its polarity, the difference in phase between the elevation error signal and the range signal and, by its amplitude, the magnitude of the error signal, a separate elevation pulse stretching and amplifying circuit for each object to be tracked, an elevation video switch for selectively switching the direct current elevation output to that elevation pulse stretching and amplifying circuit associated with the selected object and an elevation video gate connected between the elevation phase sensitive detector and the elevation switch and operable by the gating pulse derived from the range search and lock on unit associated with the selected object, the elevation gain control switch means, the range switch and the elevation video switch being operable in synchronism.

11. A system according to claim 7 including a bearing amplifier to which the intermediate frequency signals representing the range and bearing error signals are applied sequentially, the gain of said bearing amplifier being automatically controlled to be an optimum for the range and bearing error signals representing a selected object, a separate automatic gain control bearing unit for each object to be tracked, bearing gain control switch means for selectively switching across the bearing amplifier that automatic gain control bearing unit associated with the selected object and an automatic gain control bearing gate connected between the gain control bearing units and the bearing amplifier and operable by the gating pulse derived from the range search and lock on unit associated with the selected object, the bearing gain control switch means and the range switch being operable in synchronism.

12. A system according to claim 11 including a bearing phase sensitive detector to which the amplified outputs of the bearing amplifier representing the range and bearing error signals are applied simultaneously to derive a direct current bearing output representing, by its polarity, the difference in phase between the bearing error signal and the range signal and, by its amplitude, the magnitude of the error signal, a separate bearing pulse stretching and amplifying circuit for each object to be tracked, a bearing video switch for selectively switching the direct current bearing output to that bearing pulse stretching and amplifying circuit associated with the selected object and a bearing video gate connected between the bearing phase sensitive detector and the bearing video switch and operable by the gating pulse derived from the range search and lock on unit associated with the selected object, the bearing gain control switch means, the range switch and the bearing video switch being operable in synchronism.

13. A system according to claim 4 including a summation amplifier incorporating a detector stage through which the intermediate frequency output signal representing the range is supplied to the range search and lock on units in parallel.

14. A system according to claim 13 wherein the summation amplifier is a logarithmic amplifier.

15. A system according to claim 13 wherein a cathode ray tube range display system has its input connected in parallel with the inputs of the range search and lock on units.

16. A system according to claim 4 including an elevation amplifier, the gain of which is automatically controlled to be an optimum for the range and elevation error signals representing a selected object, said elevation amplifier being arranged to have the intermediate frequency signals representing the range and elevation error signals applied sequentially thereto.

17. A system according to claim 16 including a separate automatic gain control elevation unit for each object to be tracked and elevation gain control switch means for selectively switching across the elevation amplifier that automatic gain control elevation unit associated with the selected object.

18. A system according to claim 17 including an automatic gain control elevation gate connected between the gain control elevation units and the elevation amplifier and operable by the gating pulse derived from the range search and lock on unit associated with the selected object.

19. A system according to claim 16 including an elevation phase sensitive detector to which the amplified outputs of the elevation amplifier representing the range and elevation error signals are applied simultaneously to derive a direct current elevation output representing, by its polarity, the difference in phase between the elevation error signal and the range signal and, by its amplitude, the magnitude of the error signal.

20. A system according to claim 19 including a separate elevation pulse stretching and amplifying circuit for each object to be tracked and an elevation video switch for selectively switching the direct current elevation output to that elevation pulse stretching and amplifying circuit associated with the selected object.

21. A system according to claim 20 including an elevation video gate connected between the elevation phase sensitive detector and the elevation video switch and operable by the gating pulse derived from the range search and lock on unit associated with the selected object.

22. A system according to claim 20 including means for varying the elevation of the aerial system and responsive to the output of a predetermined one of said elevation pulse stretching and amplifiying circuits to vary the elevation of the aerial system in the sense to reduce to zero the elevation error signal derived from the object associated with said predetermined one elevation pulse stretching and amplifying circuit.

23. A system according to claim 20 including a cathode ray tube elevation display system to which the output of each elevation pulse stretching and amplifying circuit is connected.

24. A system according to claim 19 including a first delay unit through which the intermediate frequency signal representing the range is supplied to the elevation amplifier to cause it to arrive at the elevation amplifier after the elevation error signal, and a second delay unit affording a delay corresponding to that of the first delay unit, the output of the elevation amplifier being supplied both directly to the elevation phase sensitive detector and through said second delay unit so that the amplified range and elevation error signals arrive simultaneously at the elevation phase sensitive detector.

25. A system according to claim 4 including a bearing amplifier to which the intermediate frequency signals representing the range and bearing error signals are applied sequentially, the gain of said bearing amplifier being automatically controlled to be an optimum for the range and bearing error signals representing a selected object.

26. A system according to claim 25 including a separate automatic gain control bearing unit for each object to be tracked and bearing gain control switch means for selectively switching across the bearing amplifier that automatic gain control bearing unit associated with the selected object.

27. A system according to claim 26 including an automatic gain control bearing gate connected between the gain control bearing units and the bearing amplifier and operable by the gating pulse derived from the range search and lock on unit associated with the selected object.

28. A system according to claim 25 including a bearing phase sensitive detector to which the amplified outputs of the bearing amplifier representing the range and bearing error signals are applied simultaneously to derive a direct current bearing output representing, by its polarity, the difference in phase between the bearing error signal and the range signal and, by its amplitude, the magnitude of the error signal.

29. A system according to claim 28 including a separate bearing pulse stretching and amplifying circuit for each object to be tracked and a bearing video switch for selectively switching the direct current bearing output to that bearing pulse stretching and amplifying circuit associated with the selected object.

30. A system according to claim 29 including a bearing video gate connected between the bearing phase sensitive detector and the bearing video switch and operable by the gating pulse derived from the range search and lock on unit associated with the selected object.

31. A system according to claim 29 including means for varying the bearing of the aerial system and responsive to the output of a predetermined one of said bearing pulse stretching and amplifying circuits to vary the bearing of the aerial system in the sense to reduce to zero the bearing error signal derived from the object associated with said predetermined one bearing pulse stretching and amplifying circuit.

32. A system according to claim 29 including a cathode ray tube bearing display system to which the output of each bearing pulse stretching and amplifying circuit is connected.

33. A system according to claim 28 including a first delay unit through which the intermediate frequency signal representing the range is supplied to the bearing amplifier to cause it to arrive at the bearing amplifier after the bearing error signal and a second delay unit affording a delay corresponding to that of said first delay unit, the output of the bearing amplifier being supplied both directly to the bearing phase sensitive detector and through said second delay unit so that the amplified range and bearing error signals arrive simultaneously at the bearing phase sensitive detector.

34. A radar tracking system comprising an aerial system adapted to radiate pulses of electromagnetic energy in a directional beam and, in the interval between radiated pulses, to receive pulses of energy reflected from an object irradiated by the beam and to produce from the received pulses three output signals corresponding respectively to the amplitude sum of the received energy which represents the range of the object by its position in time relative to the immediately preceding radiated pulse, an elevation error signal the phase and amplitude of which relative to the sum signal denotes the sense and magnitude respectively of departure of the elevation of the object from the mean beam axis and a bearing error signal the phase and amplitude of which relative to the sum signal denotes the sense and magnitude respectively of departure of the bearing of the object from the mean axis, an elevation I.F. amplifier adapted to be supplied with the elevation error signal and the sum signal in series, one of these two signals being suitably delayed, a plurality of automatic gain control units corresponding in number to the number of objects capable of being handled by the system and arranged to be cyclically switched in successive intervals between radiated pulses to control the gain of the elevation I.F. amplifier at an optimum value for the respective signals reflected from at least two irradiated objects, an elevation phase sensitive detector for detecting the phase and amplitude of the amplified elevation error signal relative to that of the amplified sum signal, a plurality of pulse lengthening and amplifying circuits corresponding in number to the number of objects capable of being handled by the system and having their inputs cyclically switched to the output of the elevation phase sensitive detector in synchronism with the switching of the automatic gain control units and having their outputs connected to a display system, a selected one of the circuits having its output connected to means responsive to the output thereof to cause the aerial system to follow the elevation of the object corresponding to the selected circuit, a bearing I.F. amplifier adapted to be supplied with the bearing error signal and the sum signal in series, one of these two signals being suitably delayed, a plurality of automatic gain control units corresponding in number to the number of objects capable of being handled by the system and arranged to be cyclically switched to control the gain of the bearing I.F. amplifier at an optimum value for the respective signals reflected from at least said two irradiated objects, the switching being synchronised with that of the corresponding units associated with the elevation I.F. amplifier, a bearing phase sensitive detector for detecting the phase and amplitude of the amplified bearing error signal relative to that of the amplified sum signal, a plurality of pulse lengthening and amplifying circuits corresponding in number to the number of objects capable of being handled by the system and having their inputs cyclically switched to the output of the bearing phase sensitive detector in synchronism with the switching of the automatic gain conrol units and having their outputs connected to said display system, a selected one of the circuits, corresponding to the selected circuit associated with the elevation phase sensitive detector, having its output connected to means responsive to the output thereof to cause the aerial system to follow the bearing of said object corresponding to the selected circuit and a plurality of range search and lock-on units corresponding in number to the number of objects capable of being handled by the system and adapted to be supplied with the sum signal to provide an indication of the ranges of respective objects irradiated in the beam.

35. A system according to claim 34 capable of handling only two objects one of which is a target which the aerial system is caused to follow and the other of which is a missile directed towards the target, the system providing an indication of the range, elevation and bearing of the target, the range of the missile and the deviation of the elevation and bearing of the missile from the bearing and elevation of the target.

36. A radar tracking system adapted to radiate pulses of electromagnetic energy in a directional beam and, in the interval between radiated pulses, to receive pulses of enery reflected from an object irradiated by the beam and to produce from the received pulses three output signals corresponding respectively to the amplitude sum of the received energy which represents the range of the object by its position in time relative to the immediately preceding radiated pulse, an elevation error signal the phase and amplitude of which relative to the sum signal denotes the sense and magnitude respectively of departure of the elevation of the object from the mean beam axis and a bearing error signal the phase and amplitude of which relative to the sum signal denotes the sense and magnitude respectively of departure of the bearing of the object from the mean beam axis, elevation means for detecting the phase and amplitude difference between the elevation error signal and the sum signal due to energy reflected from an irradiated object to derive an elevation departure signal representing the magnitude of the departure of the elevation of the object from the mean beam axis, bearing means for detecting the phase and amplitude difference between the bearing error signal and the sum signal due to energy reflected from an irradiated object to derive a bearing departure signal representing the magnitude of the departure of the bearing of the object from the mean beam axis, a plurality of elevation circuits corresponding in number to a selected number of objects capable of being tracked by the system, a similar number of bearing circuits, an elevation gate operable to pass in any one of said intervals only one elevation departure signal, a bearing gate operable to pass in any one of said intervals that one bearing departure signal corresponding with said one elevation departure signal, means for cyclically and in synchronism operating said elevation and bearing gates to pass in successive intervals the elevation and bearing departure signals representing said selected number of objects, means for cylically connecting said elevation and bearing circuits respectively to said elevation and bearing gates such that each elevation and bearing circuit has applied thereto only the respective elevation and bearing departure signals representing a corresponding irradiated object, means responsive to the outputs of a selected one of the elevation circuits and the corresponding bearing circuit to cause the aerial system to follow the selected corresponding irradiated object, means for deriving the bearing and elevation of each other irradiated object relative to said selected object and means responsive to the respective sum signals derived from the irradiated objects to determine the respective ranges thereof.

References Cited by the Examiner

UNITED STATES PATENTS 2,950,474   8/60   Page  343—7.4

KATHLEEN H. CLAFFY, *Primary Examiner.*

FREDERICK M. STRADER, CHESTER L. JUSTUS, *Examiners.*